Oct. 6, 1953    W. G. WILSON    2,654,269
CHANGE-SPEED GEARING
Filed April 7, 1948    4 Sheets-Sheet 1

Inventor
W. G. Wilson
By Glascock Downing Seeley
Attys.

Oct. 6, 1953 W. G. WILSON 2,654,269
CHANGE-SPEED GEARING
Filed April 7, 1948 4 Sheets-Sheet 2

Inventor
W. G. Wilson
By Attys.

Oct. 6, 1953   W. G. WILSON   2,654,269
CHANGE-SPEED GEARING
Filed April 7, 1948   4 Sheets-Sheet 4

Inventor
W. G. Wilson

Patented Oct. 6, 1953

2,654,269

UNITED STATES PATENT OFFICE 2,654,269

CHANGE-SPEED GEARING

Walter Gordon Wilson, Martyr Worthy, near Winchester, England

Application April 7, 1948, Serial No. 19,576
In Great Britain March 11, 1947

9 Claims. (Cl. 74—751)

1

This invention relates to change speed gearing for motor vehicles and other purposes, and has for its object to provide a gear unit or arrangement having two gear ratios which may be fitted to or incorporated in the conventional gear box in the drive of a motor vehicle to afford an automatic change from a lower to a higher gear or vice versa in accordance with torque and load conditions in the drive.

Supplementary two speed gear boxes comprising a so-called overdrive, that is, including a gear ratio greater than unity, have been proposed in which the change from the lower to the higher gear is effected by mechanism involving centrifugal weights. The present invention may be applied with particular advantage to a gear unit including an overdrive ratio and it is accordingly a further object of the invention to provide an improved supplementary gear arrangement of this kind, including if desired the possibility of introducing the overdrive ratio by manually or servo actuated means. A further object of the invention is to provide a supplementary gear arrangement of the kind described in which the required change of gear ratio is effected automatically in accordance with the rate of fuel supply and the direction of the transmitted torque, or the input or output speed.

According to the invention a gear arrangement or unit for the purpose described comprises epicyclic gearing in which gear elements are capable of relative axial displacement to lock an element either with another element of the gear or with a reaction means for affording different gear ratios, and including means for effecting such axial displacement in accordance with the load or torque conditions or independently thereof, for example, at the will of the operator or driver. According to a further feature of the invention, the said axial displacement means includes a disposition of the meshing teeth of the epicyclic gear elements such that reaction between them effects the required displacement, and in a preferred arrangement the teeth are helically formed so that one of the meshing gear elements tends to be displaced axially in accordance with the direction of the transmitted torque, displacement in one direction causing certain elements of the gear to be locked together to afford a direct drive while movement in the opposite direction causes an element to be locked to a reaction member to afford a ratio determined by the freely engaged gear elements.

The invention also consists in a gear arrangement or unit for the purpose described compris-

2 ing epicyclic gearing and an axially displaceable member having driving relation with an element of the gear and displaceable to lock an element either with another element of the gear or with a reaction means for affording different gear ratios. According to a further feature of the invention, the driving relation between said axially displaceable member and an element of the gear is effected by inclined or helically disposed interengaging surfaces or teeth so that the said member tends to be displaced axially in accordance with the direction of the transmitted torque.

The displaceable reaction member referred to in the preceding paragraph may comprise an annular member having a helical tooth connection with the sun gear of an epicyclic train and movable axially thereon for frictional engagement either with the annular gear of the train or with a fixed reaction member. The arrangement is such that when a drive is applied to the planet cage or carrier the said member will be locked with the annular gear and a solid or direct drive afforded, whereas a reversal of torque will cause the said member to be frictionally locked with the fixed reaction member and thereby afford the higher or overdrive ratio. The gears of the epicyclic train of such an arrangement may have straight or spur teeth.

According to a further feature of the invention there is provided, in conjunction with a displaceable gear element or a displaceable reaction member as described in the preceding paragraphs, means for effecting displacement of the said element or the said reaction member in accordance with the rate of fuel supply to the engine. Any convenient power means or servo device may be employed for this purpose and may be controlled in accordance with the position of the accelerator pedal or equivalent element used to regulate the fuel supply. In a preferred form of the invention the means employed is hydraulic, and conveniently comprises a piston and cylinder arrangement, using low pressure oil for example, the admission and release of the actuating fluid being controlled by a valve operatively linked with the accelerator or its equivalent. Alternatively the said means may be arranged for manual actuation by the operator or driver.

According to a further feature of the invention the actuation of the displaceable gear element or reaction member is controlled by a governor responsive to the speed of the gear.

The invention accordingly provides an epicyclic gear arrangement which may be conveniently applied as a suplementary gear to a conventional form of motor vehicle gear box and will provide an automatic ratio change on any gear which has been engaged in the main gear box, in accordance with the torque and load conditions obtaining in the drive. Thus, under forward drive conditions the epicyclic gear elements will always tend to be locked together giving the lower gear ratio, whilst if the torque is reversed the ratio will automatically be changed to a higher value. Also by the provision of servo means the ratio may be automatically changed from the lower to the higher value when the fuel supply is reduced or the engine speed rises sufficiently. If desired, such control may be effected independently of the conditions of fuel supply or speed, as by manual means for example.

In the accompanying drawings.

Figure 1:
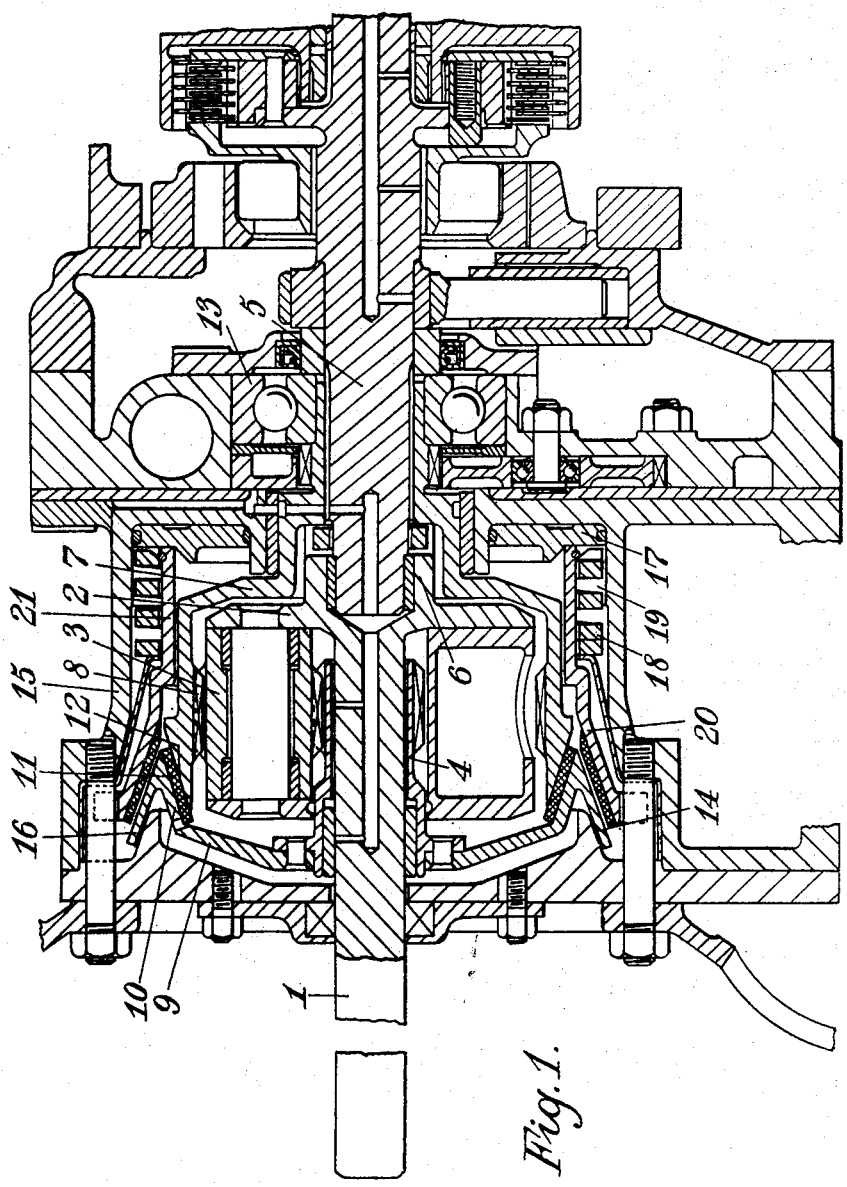
Figure 1 is a longitudinal sectional view of a supplementary epicyclic gear unit constructed in accordance with the invention and arranged for hydraulic control.

In carrying the invention into effect according to one convenient mode as applied by way of example to an overdrive or auxiliary gear box, which may be fitted to the conventional type of gear box used on motor vehicles, as shown in Figure 1, the power input or driving shaft 1 has formed on it a planet cage or carrier 2 carrying planet gears 3 having helically formed teeth meshing with a sun gear 4 rotatably mounted on the input shaft. The output or driven shaft 5 has one end resting in a recessed portion 6 on the driving shaft 1 and has secured to it an annular member 7 having internal helically formed teeth 8 encircling and meshing with the planet gears 3. The disposition of the helical teeth of the meshing gears is such that on the application of a forward drive to the input shaft 1, the output shaft being loaded, reaction between the helical teeth will tend to cause displacement of the sun gear along its axis of rotation towards the annular member 7. The sun gear 4 is axially slidable and secured to it is a disc 9 having its periphery formed as an internal cone 10 lined with friction material 11 adapted to be engaged, as a result of the movement aforesaid, with a complementary clutching surface 12 formed on the annular member 7. When the pressure of engagement is sufficient, the two elements will be locked together and a solid or direct drive from the input to the output shaft is obtained. Suitable thrust bearing means is provided to prevent endwise movement of the shaft 5, one of the bearings of which is at 13.

A stationary braking or locking surface constituting a reaction element is provided for frictional engagement by the sun element when the latter moves axially in a direction away from the annular gear member. This comprises a conical reaction surface 14 mounted on the fixed casing 15 of the gear box and adapted to be engaged by an internal cone 16 which is integral with the cone 10 on the disc 9. This surface of the cone 16 constitutes a reacting surface. An annular hydraulic piston 17 loaded by a spring 18 is movable in a cylinder 19 formed with the gear casing. The cone 16 is double sided and its outer side may be engaged by a cone member 20 forming part of a cylindrical member 21 which is restrained against rotation in the casing but is arranged so that it may be engaged for axial movement by the piston 17. The hydraulic cylinder is supplied with low pressure fluid, for example, oil at a pressure of say forty pounds to the square inch, under control of a valve which is actuated in accordance with the position of the accelerator pedal or equivalent control element of the motor vehicle. The control valve and its actuating connection with the accelerator pedal or equivalent means are arranged so that raising of the pedal, that is, reduction in the fuel supply to the engine, opens the valve to admit pressure fluid to the hydraulic cylinder, whilst downward movement of the pedal, corresponding to an increase in the fuel supply, effects the closing of the valve and the relief or discharge of pressure fluid from the cylinder.

Figure 4:
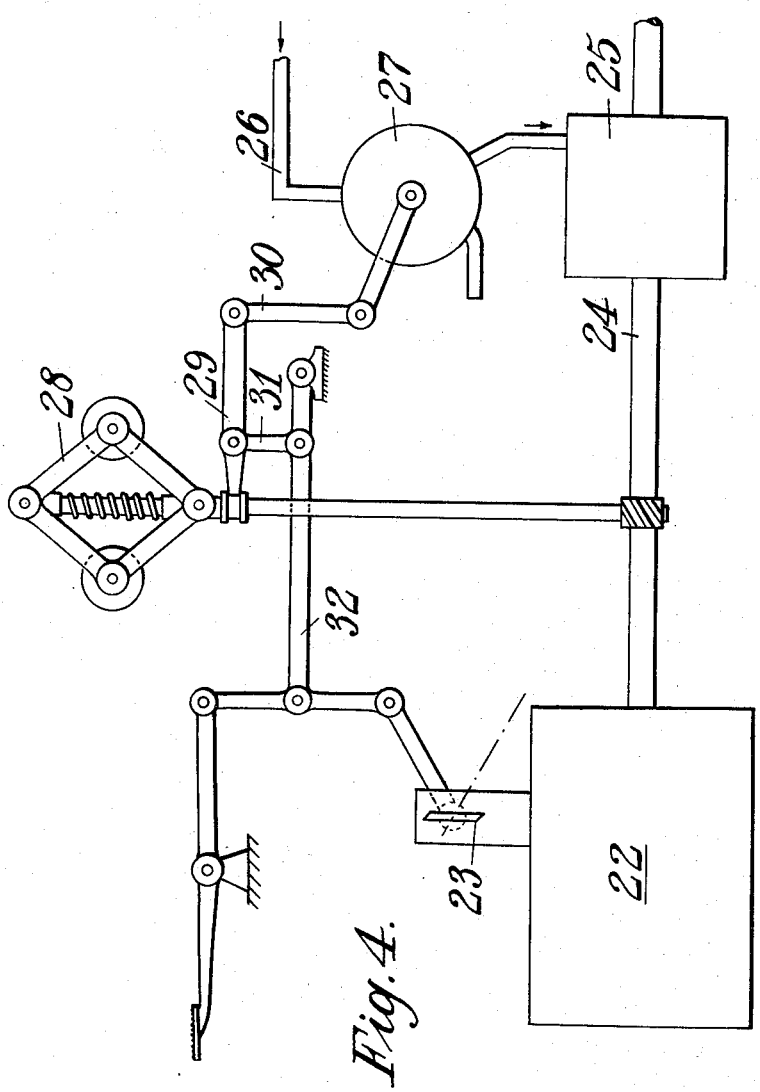
Figure 4 is a diagram showing the interconnection of the control elements for a gear unit as shown in Figures 1 and 2.

The operation of the throttle valve may be effected by a speed governor as shown diagrammatically in Figure 4. The engine 22 having a throttle 23 drives the input shaft 24 of the overdrive unit 25 which corresponds to the gear previously described. Pressure oil supplied by a pipe 26 is controlled by a valve 27 which according to its position either admits oil to the cylinder of the gear unit or exhausts the oil therefrom. A speed governor 28 driven from the engine shaft is connected by a lever 29 and a link 30 to the valve 27. The lever 29 is also connected by a link 31 to a lever 32 which is linked to the throttle valve 23. In the position in which the elements are shown the throttle valve is open and there is a direct drive through the unit 25.

With the above described arrangements a forward drive applied to the input shaft and a load or resistance on the output shaft will result in an axial sliding movement of the sun gear 4 bringing the frictional surface 11 into contact with the complementary surface 12 on the annular gear member, and the pressure of engagement will lock these surfaces together so that the epicyclic gearing revolves as a single solid element, giving a direct drive between the input and output shafts. The application of the forward drive involves opening of the engine throttle and therefore the pressure of fluid in the hydraulic cylinder will be zero. If the supply of fuel to the engine is reduced by shutting the engine throttle valve, or, alternatively, if the speed governor is actuated by excessive engine speed, then pressure fluid is admitted to the hydraulic cylinder to displace the sun gear axially so that the friction surface 11 is disengaged from the annular gear and brought into engagement with the stationary cone element 14, thereby locking the sun gear against rotation. The gearing will now operate as an epicyclic, the planets revolving about the fixed sun and driving the annular gear member 7 to give an increased ratio, that is, the so-called overdrive in which the gear ratio is greater than 1:1.

The engine speed is thereby prevented from further increase and is gradually reduced to that corresponding to the ratio afforded by the overdrive.

It may be noted that the change from the low or direct drive to the higher ratio is effected without any interruption in the drive, since the sun gear is only released from locked relation with the annular gear by the operation of the hydraulic piston, and the cone or equivalent member actuated by the said piston is brought into frictional engagement with the cone surface of the sun gear before the said surface is disengaged from the frictional surface of the annular gear. In this way, rotation of the sun gear is prevented whilst it is in process of displacement into engagement with the fixed reaction element.

If the torque on the gear box should be reversed, as may occur for example when the vehicle is descending a hill, the reaction between the helical teeth of the sun and planet gears will displace the sun gear out of the direct drive position into the overdrive position, this action taking place automatically without any manipulation by the driver.

If the gear is in the overdrive position and the engine speed is sufficiently low to require the lower gear, that is, a direct drive, then if the driver depresses the accelerator pedal this will cause the fluid pressure in the hydraulic cylinder to be relieved and the sun gear will then be free to assume a position of locked engagement with the annular gear, and thus provide a direct drive. With the automatic arrangement according to Figure 4, this action will be effected alternatively by the speed governor on attainment of excessive speed. At this stage the engine is free since the frictional surfaces of the sun gear are disengaged on both sides, and the engine will accelerate until reaction between the helical teeth displaces the sun gear into locked relation with the annular gear to afford the direct drive. It will be noted that in these circumstances the engine can never accelerate more than is required for the speed of the vehicle at that time.

Figure 2:
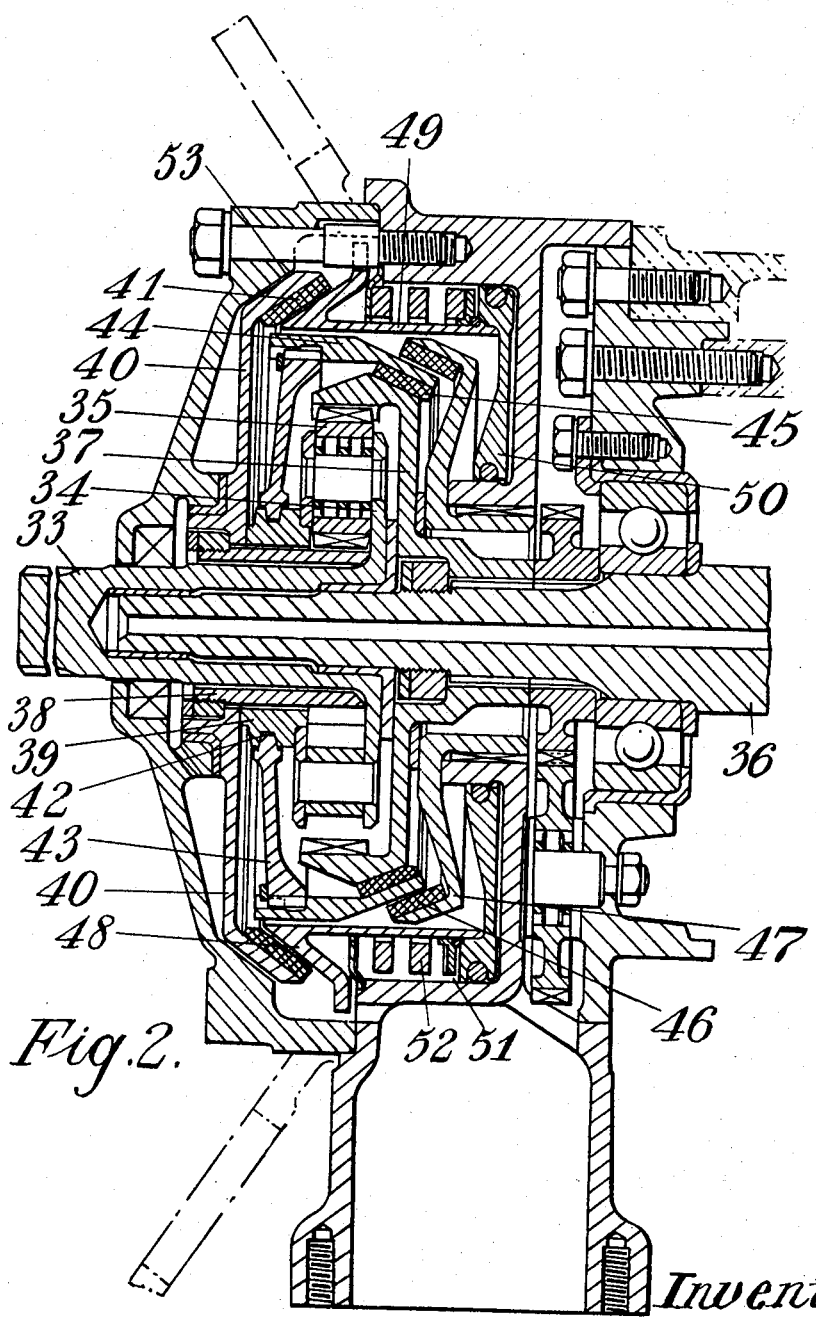
Figure 2 is a similar view of a modified form of unit arranged for hydraulic control and in which the teeth of the epicyclic gear elements are of straight form.

In carrying the invention into effect according to a modified mode as shown in Figure 2, an auxiliary gear box is provided having the principal elements of the previously described example, but including additional means whereby the same results may be obtained without the necessity for a substantial thrust bearing on the output shaft. The input shaft 33 has formed on it a planet carrier 34 on which are mounted the planet pinions 35 having a spur or straight teeth. The output shaft 36 has secured to it an annular gear member 37 having internal straight teeth which mesh with the pinions 35. The sun gear 38 meshes with the pinions 35 and is rotatable on the shaft 33 and has keyed to it a hub 39 and a brake disc 40 having a conical outer periphery lined with friction material 41. The hub 39 has formed in it a helical groove or grooves 42 in which engages a corresponding helical formation on a disc 43 on which is carried an annulus 44 having a friction lining 45 adapted to be brought into engagement with a corresponding clutching surface on the annular gear member 37. The said annulus 44 is also adapted to be brought into engagement with the friction lining 46 on a fixed reaction element or member 47 secured to the fixed casing 51 which surrounds the gearing and includes side wall means spaced therefrom and through which the input and output shafts extend. The disposition of the helical groove 42 is such that when a forward drive is applied to the input shaft 33 the displaceable reaction member 44 will be disengaged from the fixed reaction surface 46 and brought into engagement with the clutching surface of the annular gear member 37.

The friction clutching surface 41 of the brake disc 40 keyed to the sun gear is adapted to be engaged by a complementary reacting surface 48 on a member 49 which is axially displaceable by a hydraulic piston 50 slidable in a cylinder formed in the fixed casing 51 against a spring 52 and controlled in the same manner as in the previously described example. With this arrangement, a forward drive applied to the input shaft 33 causes axial displacement of the displaceable reaction member 44 to bring this into frictional locking relation with the annular gear member 37 so that a direct or solid drive results. At this time the said displaceable reaction member 44 will also be out of engagement with the fixed reaction member 47. Should the speed of the engine rise sufficiently to require the overdrive ratio, raising of the accelerator pedal or operation of the speed governor will cause pressure fluid to be admitted to the cylinder 51, and the piston 50 will bring the non-rotatable brake surface 48 into engagement with the friction lining 41 on the brake disc, whereby the sun wheel will be brought to rest and, by relieving the displaceable reaction member 43 and annulus 44 of the driving torque the latter will be disengaged from the annular gear member 37, the planets then revolving about the fixed sun and affording the overdrive ratio. It may be noted that the pressure exerted by the hydraulically actuated member 48 will cause the brake disc 40 to be held against a conical part 53 of the fixed casing, but such engagement will not take place until the disc 40 has been reduced in speed or brought to rest. With the gearing in this position, depression of the accelerator pedal or a drop in engine speed will relieve the pressure in the hydraulic cylinder and the reaction member 44 will return to locked relation with the annular gear member. If the torque should be reversed when the gears are in the direct drive position, the displaceable reaction member 44 will move out of engagement with the annular gear member and into locking engagement with the stationary reaction member 47, thereby locking the sun gear and affording the overdrive gear ratio. As in the previously described example there is no free engine position unless pressure oil is released from the hydraulic cylinder arrangement, in which circumstances the engine is permitted to accelerate until the reaction between the helical groove in the hub 39 and the displaceable member 43 is sufficient to displace the latter and so provide lower ratio or direct drive. When the engine is driving and the accelerator is depressed, the direct drive will always be engaged unless the engine attains excessive speed. Conversely, if the torque on the gear is reversed, as will occur if the vehicle is proceeding downhill and attempts to drive the engine, the overdrive ratio will always be automatically engaged.

Figure 3:
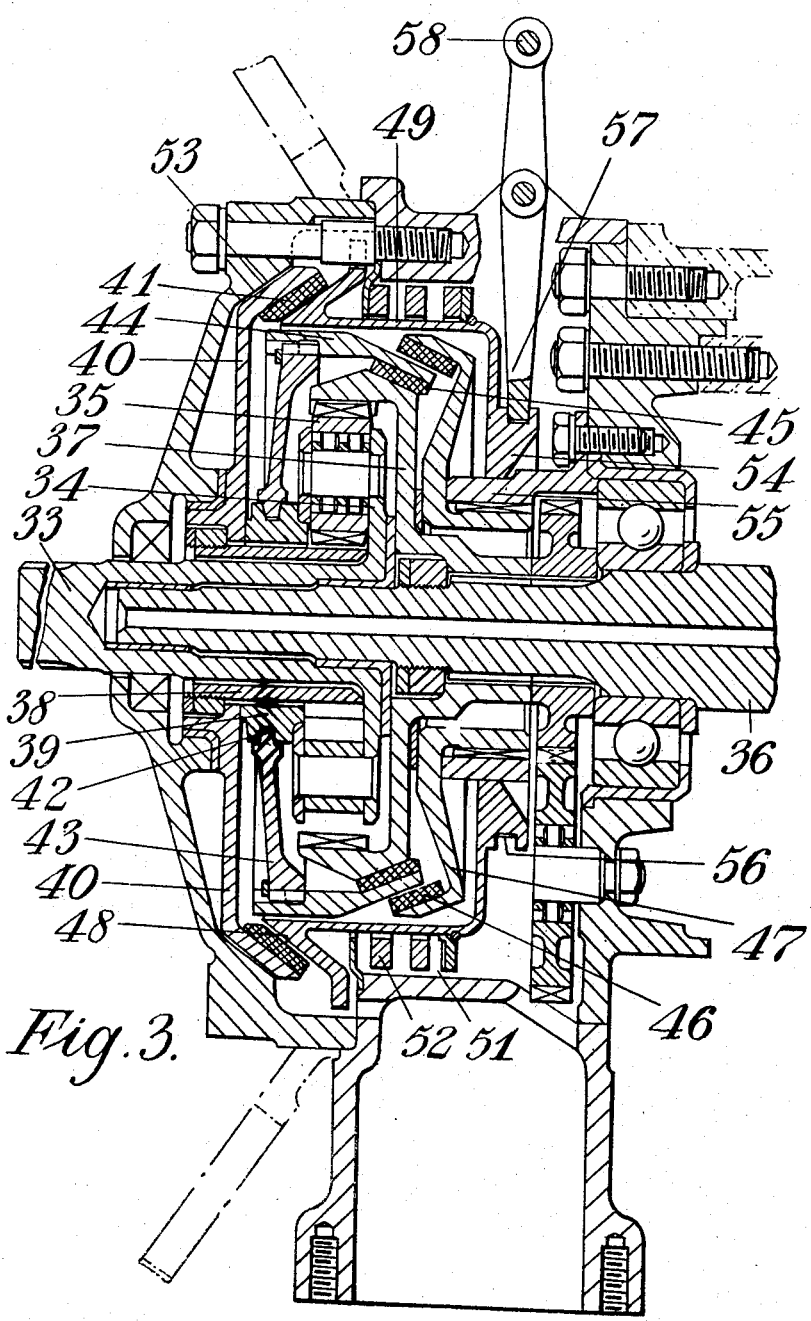
Figure 3 is a similar view of a unit having the gear elements arranged as in Figure 2 but with manual control.

In carrying the invention into effect according to another mode as illustrated in Figure 3, the arrangement of the gear elements is the same as in the previously described example, but the hydraulic piston arrangement is omitted and the application of the overdrive is effected by manual means. The member 49 has formed on it a ring 54 which is slidable on a cylindrical extension 55 of the casing. A peripheral groove or recess in the ring is engaged by one end of a lever 57 pivoted on the casing and having a pin 58 thereon whereby it may be actuated manually or by pedal in any convenient manner. Such an arrangement could obviously be applied in the same way to the gear arrangement shown in Figure 1. The operation of the gear will be similar to that of the previously described examples except that the overdrive ratio is introduced by direct manual operation, except under reverse torque conditions when the application of the overdrive is automatic.

The frictional surfaces which are engageable to lock the different parts of the gear described in connection with the foregoing examples may be of other than conical form if desired.

It will be appreciated that the examples described with reference to Figures 1 and 2 afford the same operating results, and although the form shown in Figure 2 requires an additional operative element, namely the displaceable reaction member, an advantage is obtained in that the necessity for a substantial thrust bearing on the output shaft to take the end thrust when the high gear is in operation, is eliminated. The end thrust is taken up internally within the locked elements when the direct drive is in operation.

The invention accordingly provides a relatively simple and automatically changing gear arrangement or overdrive unit which may be combined with a conventional gear box in a motor vehicle and will operate without intervention by the driver on any gear ratio engaged in the main gear box to change the ratio of the auxiliary gear to the value appropriate to the load and torque or speed conditions. The invention also provides for changes of ratio independently of such conditions, e. g. at the will of the operator or driver.

I claim:

1. Change speed gearing comprising, in combination, epicyclic gearing including sun, planet, and annular gear elements, a non-rotatable reaction element, an axially movable member having a driving relation with one of the gear elements constituted by helically formed interengaging surfaces and displaceable automatically in accordance with the direction of torque transmitted by the gearing into either of two end positions, in one of which the said member is held in locked relation with another gear element to connect the said gear elements in driving relation and thereby afford one gear ratio, and in another of which positions the said member is held in locked relation with the reaction element to afford another gear ratio, a non-rotatable and axially movable member, means independent of the direction of torque transmission in the gearing, for displacing said last mentioned member to engage and lock against rotation the gear element having driving relation with the first said axially movable member, power means for displacing said non-rotatable and axially movable member, and means movable in accordance with engine fuel supply for controlling said power means.

2. Change speed gearing comprising, in combination, epicyclic gearing including sun, planet, and annular gear elements, a non-rotatable reaction element, an axially movable member having a driving relation with one of the gear elements constituted by helically formed interengaging surfaces and displaceable automatically in accordance with the direction of torque transmitted by the gearing into either of two end positions, in one of which the said member is held in locked relation with another gear element to connect the said gear elements in driving relation and thereby afford one gear ratio, and in another of which positions the said member is held in locked relation with the reaction element to afford another gear ratio, a non-rotatable and axially movable member, means independent of the direction of torque transmission in the gearing, for displacing said last mentioned member to engage and lock against rotation the gear element having driving relation with the first said axially movable member, power means for displacing said non-rotatable and axially movable member, and means responsive to engine speed for controlling said power means.

3. Change speed gearing comprising, in combination, epicyclic gearing including sun, planet, and annular gear elements, a non-rotatable reaction element, axially movable means in driving association with one of the gear elements and engageable in one axial position with another gear element to lock the elements together and thereby afford one gear ratio and engageable in another axial position with the reaction element to lock the said gear and reaction elements together to afford a different ratio, means responsive to the direction of torque transmitted by the gearing for automatically effecting displacement of the axially movable means in either direction upon a reversal of the torque conditions in the gearing, means independent of the direction of torque transmission in the gearing for displacing said axially movable means from one axial position to another, and means movable in accordance with engine fuel supply for controlling said power means.

4. Change speed gearing comprising, in combination, epicyclic gearing including sun, planet, and annular gear elements, a non-rotatable reaction element, axially movable means in driving association with one of the gear elements and engageable in one axial position with another gear element to lock the elements together and thereby afford one gear ratio and engageable in another axial position with the reaction element to lock the said gear and reaction elements together to afford a different ratio, means responsive to the direction of torque transmitted by the gearing for automatically effecting displacement of the axially movable means in either direction upon a reversal of the torque conditions in the gearing, means independent of the direction of torque transmission in the gearing for displacing said axially movable means from one axial position to another, and means responsive to engine speed for controlling said power means.

5. Change speed gearing including in combination, input and output shafts, epicyclic gearing including a sun gear rotatably mounted on the input shaft, planet gears meshing with said sun gear and mounted for rotation with said input shaft, and annular gear means meshing with said planet gears and mounted for rotation with said output shaft, a casing surrounding said gearing and including side wall means spaced from the gearing and end walls through which said shafts extend, said annular gear means having an external clutching surface embodied therewith, means providing a non-rotatable reaction element within the casing and spaced from the clutching surface of said annular gear means, axially movable means rotatable with said sun gear and including a portion having clutching and reacting surfaces movably disposed in the space between said clutching surface and said reaction element, one of said surfaces of said axially movable means in one axial position thereof engaging said clutching surface to lock said gears together to afford one gear ratio and the other of said surfaces of said axially movable means in another axial position engaging said reaction element to lock said sun gear to afford a different gear ratio, means responsive to the direction of torque transmitted by the gearing for automatically effecting displacement of the axially movable means in either direction upon a reversal of the torque conditions in the gearing, and overriding control means independent of the first mentioned torque conditions for effecting displacement of said axially movable means from one axial position to another, said overriding control means including a second axially movable member non-rotatably mounted within the casing for axial movement thereof between the first position where it does not effect said first mentioned axially movable means and a second position which does effect displacement of said axially movable means, means normally maintaining said second axially movable member in its first position, and means for shifting the same to its second position.

6. Change speed gearing including in combination, input and output shafts, epicyclic gearing including a sun gear rotatably mounted on the input shaft, planet gears meshing with said sun gear and mounted for rotation with said input shaft, and annular gear means meshing with said planet gears and mounted for rotation with said output shaft, a casing surrounding said gearing and including side wall means spaced from the gearing and end walls through which said shafts extend, said annular gear means having an external clutching surface embodied therewith, means providing a non-rotatable reaction element within the casing and spaced from the clutching surface of said annular gear means, axially movable means rotatable with said sun gear and including a portion having clutching and reacting surfaces movably disposed in the space between said clutching surface and said reaction element, one of said surfaces of said axially movable means in one axial position thereof engaging said clutching surfaces to lock said gears together to afford one gear ratio and the other of said surfaces of said axially movable means in another axial position engaging said reaction element to lock said sun gear to afford a different gear ratio, means responsive to the direction of torque transmitted by the gearing for automatically effecting displacement of the axially movable means in either direction upon a reversal of the torque conditions in the gearing, and overriding control means independent of the first mentioned torque conditions for effecting displacement of said axially movable means from one axial position to another, said overriding control means including a second axially movable member non-rotatably mounted within the casing for axial movement thereof between a first position where it does not effect said first mentioned axially movable means and a second position which does effect displacement of said axially movable means, means normally maintaining said second axially movable member in its first position, means for shifting the same to its second position, and said last mentioned means including a piston, said casing embodying surfaces defining a cylinder within which said piston is movable and said piston being operably associated with said second axially movable member and fluid supply, and exhaust means operative between positions to permit fluid flow to said piston to move the same and thereby said second mentioned axially movable member or to exhaust fluid to permit the means normally moving said second mentioned axially movable member to its first position to restore it to said first position.

7. Change speed gearing including in combination, input and output shafts, epicyclic gearing including a sun gear rotatably mounted on the input shaft, planet gears meshing with said sun gear and mounted for rotation with said input shaft, and annular gear means meshing with said planet gears and mounted for rotation with said output shaft, a casing surrounding said gearing and including side wall means spaced from the gearing and end walls through which said shafts extend, said annular gear means having an external clutching surface embodied therewith, means providing a non-rotatable reaction element within the casing and spaced from the clutching surface of said annular gear means, axially movable means rotatable with said sun gear and including a portion having clutching and reacting surfaces movably disposed in the space between said clutching surface and said reaction element, one of said surfaces of said axially movable means in one axial position thereof engaging said clutching surface to lock said gears together to afford one gear ratio and the other of said surfaces of said axially movable means in another axial position engaging said reaction element to lock said sun gear to afford a different gear ratio, means responsive to the direction of torque transmitted by the gearing for automatically effecting displacement of the axially movable means in either direction upon a reversal of the torque conditions in the gearing, and overriding control means independent of the first mentioned torque conditions for effecting displacement of said axially movable means from one axial position to another, said overriding control means including a second axially movable member non-rotatably mounted within the casing for axial movement thereof between a first position where it does not effect said first mentioned axially movable means and a second position which does effect displacement of said axially movable means, means normally maintaining said second axially movable member in its first position, means for shifting the same to its second position, and said last mentioned means including an annular member constituting a portion of said second mentioned axially movable member, and manually operable lever means associated with said annular member and operable to move the same to its second position.

8. Change speed gearing including in combination, input and output shafts, epicyclic gearing including a sun gear rotatably mounted on the input shaft, planet gears meshing with said sun gear and mounted for rotation with said input shaft, and annular gear means meshing with said planet gears and mounted for rotation with said output shaft, a casing surrounding said gearing and including side wall means spaced from the gearing and end walls through which said shafts extend, said annular gear means having an external clutching surface embodied therewith, means providing a non-rotatable reaction element within the casing and spaced from the clutching surface of said annular gear means, axially movable means rotatable with said sun gear and including a portion having clutching and reacting surfaces movably disposed in the space between said clutching surface and said reaction element, one of said surfaces of said axially movable means in one axial position thereof engaging said clutching surface to lock said gears together to afford one gear ratio and the other of said surfaces of said axially movable means in another axial position engaging said reaction element to lock said sun gear to afford a different gear ratio, means responsive to the direction of torque transmitted by the gearing for automatically effecting displacement of the axially movable means in either direction upon a reversal of the torque conditions in the gearing, and overriding control means independent of the first mentioned torque conditions for effecting displacement of said axially movable means from one axial position to another, said overriding control means including a second axially movable member non-rotatably mounted within the casing for axial movement thereof between a first position where it does not effect said first mentioned axially movable means and a second position which does effect displacement of said axially movable means, means normally maintaining said second axially movable member in its first position, means for shifting the same to its second position, said last mentioned means including a piston, said casing embodying surfaces defining a cylinder within which said piston is movable and said piston being operably associated with said second axially movable member and fluid supply and exhaust means operative between positions to permit fluid flow to said piston to move the same and thereby said second mentioned axially movable member or to exhaust fluid to permit the means normally moving said second mentioned axially movable member to its first position to restore it to said first position, and said overriding control means further including a third axially movable member rotatable with said sun gear and embodying a clutching surface, said end wall of the casing adjacent said third mentioned axially movable member having a complementary reaction surface and said second mentioned axially movable member having a reacting surface engageable with the clutching surface on said third mentioned axially movable member and operative to move the same into engagement with the reaction surface on the end wall of the casing to effect displacement of said first mentioned axially movable means.

9. Change speed gearing including in combination, input and output shafts, epicyclic gearing including a sun gear rotatably mounted on the input shaft, planet gears meshing with said sun gear and mounted for rotation with said input shaft, and annular gear means meshing with said planet gears and mounted for rotation with said output shaft, a casing surrounding said gearing and including side wall means spaced from the gearing and end walls through which said shafts extend, said annular gear means having an external clutching surface embodied therewith, means providing a non-rotatable reaction element within the casing and spaced from the clutching surface of said annular gear means, axially movable means rotatable with said sun gear and including a portion having clutching and reacting surfaces movably disposed in the space between said clutching surface and said reaction element, one of said surfaces of said axially movable means in one axial position thereof engaging said clutching surface to lock said gears together to afford one gear ratio and the other of said surfaces of said axially movable means in another axial position engaging said reaction element to lock said sun gear to afford a different gear ratio, means responsive to the direction of torque transmitted by the gearing for automatically effecting displacement of the axially movable means in either direction upon a reversal of the torque conditions in the gearing, said axially movable means including an annulus and an apertured disk carrying the same, the means responsive to the direction of torque including a hub rotatable with the sun gear and having a helical groove provided in the periphery thereof and said disk having an internal tooth of corresponding helical formation engaging the groove.

WALTER GORDON WILSON.

References Cited in the file of this patent

UNITED STATES PATENTS

| Number | Name | Date |
|---|---|---|
| 1,279,659 | Cotterman | Sept. 24, 1918 |
| 1,463,447 | Stahl | July 31, 1923 |
| 1,526,719 | Saives | Feb. 17, 1925 |
| 2,103,540 | Livermore | Dec. 28, 1937 |
| 2,136,971 | Fleischel | Nov. 15, 1938 |
| 2,154,419 | Cotterman | Apr. 18, 1939 |
| 2,224,322 | Sinclair | Dec. 10, 1940 |
| 2,241,088 | Griswold | May 6, 1941 |
| 2,244,133 | Taylor | June 3, 1941 |
| 2,329,724 | Maurer | Sept. 21, 1943 |
| 2,371,564 | Wemp | Mar. 13, 1945 |

FOREIGN PATENTS

| Number | Country | Date |
|---|---|---|
| 698,402 | France | Jan. 30, 1931 |
| 823,798 | France | Jan. 26, 1938 |
| 456,007 | Great Britain | Nov. 2, 1936 |